United States Patent [19]

Lundsgaard

[11] Patent Number: 4,638,407
[45] Date of Patent: Jan. 20, 1987

[54] SOLID STATE ELECTROCHEMICAL DEVICE

[76] Inventor: Jorgen S. Lundsgaard, c/o Hope Industries, Inc., 2421 Wyandotte Rd., Willow Grove, Pa. 19090

[21] Appl. No.: 735,880

[22] Filed: May 20, 1985

[51] Int. Cl.$^4$ .............................................. H01G 9/00
[52] U.S. Cl. .................................... 361/433; 252/62.2
[58] Field of Search .................... 361/433; 252/62.2; 429/188, 191, 196; 29/623.1

[56] References Cited

U.S. PATENT DOCUMENTS 3,536,963 10/1970 Boos .................................... 361/433
4,164,068 8/1979 Shropshire et al. ............... 29/623.1

Primary Examiner—L. T. Hix
Assistant Examiner—Douglas S. Lee
Attorney, Agent, or Firm—Zachary T. Wobensmith, III

[57] ABSTRACT

An all-solid state double layer capacitor and an all-solid state multicell electrochemical device are disclosed. The electrolyte material employed in the devices consists of a polymer such as polyethylene oxide and an inorganic salt which renders the polymer material ionically conductive.

10 Claims, 2 Drawing Figures

SOLID STATE ELECTROCHEMICAL DEVICE

FIELD OF THE INVENTION

The invention relates to an all-solid state multicell electrochemical device of the type consisting of a plurality of bipolar electrodes and a plurality of electrolyte layers arranged to provide a functional device.

BACKGROUND OF THE INVENTION

The structure of a double layer capacitor is well-known to those skilled in the art. Such a cell comprises a pair of electronically conductive elements, for example, metal foil or discs, having an electrolyte solution sandwiched therebetween. The electrolyte solution is divided into two electrodes by an ion-permeable separator. The electrolyte solution is a liquid or paste which is sealed within the capacitor structure using, for example, a gasket. A capacitor of this type is described in, for example, U.S. Pat. No. 3,536,963.

It is also known to arrange a plurality of carbon-containing, bipolar electrode structures in functional arrangement, and to provide an electrolyte liquid or paste between adjacent pairs of bipolar electrodes. Such a multicell device is shown in U.S. Pat. No. 4,164,068. This patent discloses a structure consisting of a plurality of bipolar, carbon-plastic electrode structures. The structures are formed by first molding an electronically conductive, carbon-containing, plastic sheet, and then providing a dielectric frame around each of the resulting sheets. When the individual elements are welded together, chambers are formed which are capable of holding liquid or paste electrolyte between each adjacent pair of bipolar electrodes. These chambers are filled with a suitable liquid or paste electrolyte composition.

The invention avoids the problems associated with electrochemical devices or double-layer capacitors of the aforesaid type which contain liquid or paste electrolyte material. Devices which utilize a liquid or paste electrolyte inevitably suffer from problems of leakage and the resulting hazards. Additionally, a non-liquid device would avoid the separate step of adding a seal or gasket to contain the electrolyte.

In Europe, considerable attention has been focused upon the fabrication of solid state batteries, based upon, for example, lithium metal. Lithium has been of interest due to its low density and highly electropositive nature. Such cells incorporate, for example, a lithium or lithium based anode, and a cathode containing a vanadium oxide compound, $V_6O_{13}$, for example, as the active material. The lithium anode may be a metal foil. The electrolyte layer consists of a polymer such as polyethylene oxide and a lithium salt. The cathode structure consists of a composite material containing the active cathode material $V_6O_{13}$, a polymer electrolyte material, and carbon in the form of acetylene black. These batteries have been found to be beneficial in terms of ease of construction, ruggedness, interfacial properties, open circuit voltage, energy density, and rechargability.

It is known and common to fabricate capacitors using ceramic materials. The use of ceramics in a solid state capacitor, however, involves serious drawbacks. First, the ceramic only operates at extremely high temperatures. Also, the ceramic material cannot be mixed effectively with another material to provide a composite material having a large operable surface area.

Apart from the aforesaid, electrochemical devices and double-layer capacitors of the type described which are known and in use today employ a liquid, paste, or molten electrolyte. The need exists for a device which does not suffer from the drawbacks of a device utilizing liquid or paste electrolyte, yet which has increased electrical characteristics due to large surface area and which is operable at moderate temperatures.

SUMMARY OF THE INVENTION

The invention relates to a double layer capacitor or a multicell electrochemical device wherein the electrolyte material consists of an ionically conductive polymeric material. The devices of the invention are entirely solid-state. The solid-state electrolyte material of the invention comprises a polymer, for example, polyethylene oxide, and an inorganic salt which renders the polymer ionically conductive. The inorganic salt may be selected from the group consisting of $LiClO_4$, $NaClO_4$, $LiLF_3So_3$, $LiBF_4$. Suitable bipolar electrode structures containing vanadium oxide and activated carbon, for use in connection with the aforesaid electrolyte to provide an all-solid state electrochemical device, are disclosed.

DESCRIPTION OF THE DRAWINGS

The nature and characteristic features of the invention will be more readily understood from the following description taken in connection with the accompaying drawings forming part herein in which.

Figure 1:
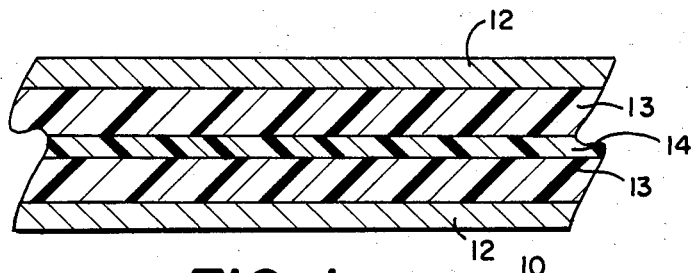
FIG. 1 shows a double-layer capacitor constructed according to the invention.

It should, of course, be understood that the description and drawings herein are illustrative merely and that various modifications and changes can be made in the structure disclosed without departing from the spirit of the invention.

DETAILED DESCRIPTION OF THE INVENTION

In one embodiment, the invention comprises a double layer capacitor structure wherein the construction is entirely solid state. The conventional liquid, paste, or molten electrolyte is replaced with an ionically-conductive polymer compositon. It is contemplated, however, to also employ the invention in electrochemical devices having multiple layers. In such an arrangement, the electrode structures are bipolar in nature and are interspersed with layers of the solid-state electrolyte material. According to the present invention, the ionically conductive layers interspersed between the electrodes consist of the ionically conductive polymeric material. Such a construction leads to the aforementioned advantage of avoiding leakage, while at the same time lending itself to the further advantage of ease of construction.

The electrode structures of the multicell electrochemical device can be formed of activated carbon compounded with any suitable polymeric material. Such a structure is well known in the art. A suitable conductive carbon black or acetylene black is compounded with a thermoplastic or a thermoset polymer. Suitable polymers include acrylic resins, polyvinyl resins, or styrene copolymers, for example. The bipolar electrode structures are formed by any well known method of molding or extrusion.

Although any known plastic electrode structure may be employed in the multicell electrochemical devices of the invention, it has been found preferable to employ the particular electrode compositions hereinafter described. The preferred electrode compositions are based upon vanadium oxide and a polymer containing activated carbon. The preferred vanadium oxide component is $V_6O_{13}$. The polymer additionally contains an inorganic salt which renders it ionically conductive. This type of electrode has previously found application as the cathode in a solid-state lithium battery. The following composition, described in parts by weight, provides a particularly effective bipolar electrode composition for use in the invention:

Vanadium Oxide ($V_6O_{13}$): 70%
Polyethylene Oxide (MW 4,000,000): 15%
Graphite: 7.5%
Lithiumtrifluorosulfonate ($LiLF_3SO_3$): 7.5%

The bipolar electrode structure may be prepared using the following procedure. To 3 g of polyethylene oxide is added 70 ml of methanol, with stirring. 70 ml of trichloroethylene is then added to the above mixture. To the above is added 14 g of finely-divided vanadium oxide ($V_6O_{13}$), 3 g of graphite, and 1.8 g of lithiumtrifluorosulfonate ($LiCF_3SO_3$). The resulting mixture is mixed in a ball mill for six hours, while allowing gas bubbles to escape.

The solid state electrolyte material of the invention is composed of a polymer such as polyethylene oxide and a suitable inorganic salt, the inorganic salt being one which renders the polymer ionically conductive. Examples of inorganic salts which have been found operable in the invention include lithium tetraborate ($LiBF_4$), sodium perchlorate ($NaClO_4$), lithium perchlorate ($LiClO_4$), and lithiumtrifluorosulfonate ($LiCF_3SO_3$). The resulting polymer composition provides a preferred solid state ion-conductive material for use in a double layer capacitor, or as the electrolyte layer in a multicell electrochemical device. It has been found preferable to employ between sixty and seventy percent by weight polymer and between thirty and forty percent by weight of inorganic salt in the composition. An example of preparation of the polymer electrolyte is as follows. To 3 g of polyethylene oxide (MW 4,000,000) is added 10 ml of isopropyl alcohol, with stirring. 135 ml of acetonitrile is next added. 1.8 g of lithiumtrifluorosulfonate is then added to the above, followed by mixing in a ball mill.

Both the electrode composition and the electrolyte composition, when prepared as described above, are contained in an organic solvent after processing in the ball mill. One effective method of forming a thin layer from the compositions is to deposit the composition as a thin layer and allow the solvent to evaporate. A preferred technique for providing a thin layer is the "doctor-blade" coating method. This method easily allows the formation of films as thin as 25-50 micrometers. In accordance with this method, a liquid film is deposited on a moving substrate from a liquid reservoir. This method is well-known in the art and is not described in detail.

A preferred feature of the above described electrode structure is their high capacitance due to their large available surface area, due to interspersion of $V_6O_{13}$ throughout the electrode.

In accordance with the invention, it is possible to continuously fabricate each layer of the composite structure in a sheet or roll. Multilayer electrochemical devices are then readily fabricated from the resulting sheet or roll.

The electrochemical device of the invention may also include any number of standard cell elements such as separators, spacers, membranes, or current collectors.

Reference is now made specifically to the drawings and the embodiments of the invention shown therein.

FIG. 1 shows a solid-state double-layer capacitor 10 constructed in accordance with the invention. Top and bottom layers 12 are electronically conductive and may be formed of metal, such as copper or nickel, or may be formed of an electronically conductive polymer composition. Layers 13 sandwiched between the conductive elements comprise the electrodes, and are formed of ionically and electronically conductive polymer, for example polyethylene oxide containing $V_6O_{13}$ or activated carbon, and an inorganic salt. Layer 14 is a separator layer consisting of an ionically conductive material which is electrically non-conductive, for example polyethylene oxide containing an inorganic salt.

Figure 2:
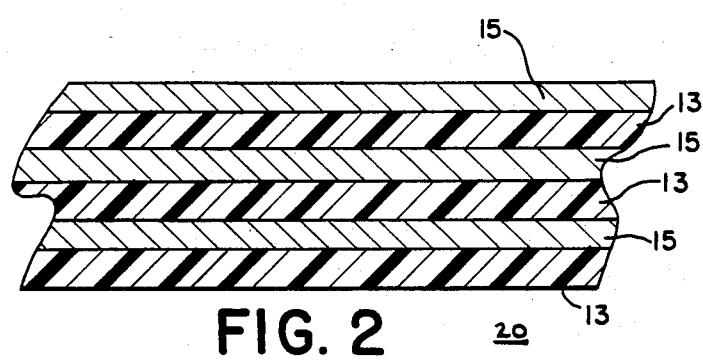
FIG. 2 shows a multicell electrochemical device constructed according to the invention.

FIG. 2 shows a solid-state multicell electrochemical device 20 constructed in accordance with the invention. Bipolar electrode structures 15 are interspersed with electrolyte layers 13 to provide a functional electrochemical device. The bipolar electrodes are constructed as previously described, and the electrolyte consists of ionically-conductive polymeric material.

Both of the aforesaid structures may be prepared as continuous sheets or rolls. One layer is laminated directly onto the underlying layer.

The above specific examples are intended as example and not as limitation, and the scope of the invention is defined only by the following claims.

I claim:

1. An all-solid state multicell electrochemical device comprising in combination:
   (a) a plurality of carbon-containing bipolar electrode structures; and
   (b) a plurality of solid-state electrolyte layers consisting essentially of a polymer material rendered ionically conductive by addition of an inorganic salt; said electrode structures and said electrolyte layers being functionally arranged to provide an electrochemical device.

2. The device set forth in claim 1 wherein said polymer material consists of polyethylene oxide.

3. The device set forth in claim 2 wherein said inorganic salt is selected from the group consisting of $LiCF_3SO_3$, $LiClO_4$, $NaClO_4$, and $LiBF_4$.

4. The electrochemical device set forth in claim 3 wherein said carbon-containing bipolar electrode structures contain polyethylene oxide polymer and vanadium oxide in the form of a composite electrode.

5. The electrochemical device set forth in claim 4 wherein the polyethylene oxide polymer in said bipolar electrode structures additionally contains an inorganic salt.

6. The multicell electrochemical device set forth in claim 1 which consists of alternating thin layers of electrolyte and thin layer bipolar electrode structures.

7. A solid state double-layer capacitor comprising in combination:
   (a) a pair of electronically conductive layers;
   (b) an electrolyte material between said conductive layers, the electrolyte material consisting essentially of polymer material rendered ionically conductive by the addition of an inorganic salt and electronically conductive by the addition of activated carbon; and (c) a separator dividing said electrolyte material into electrodes, said separator consisting essentially of a layer of polymer rendered ionically conductive by the addition of an inorganic salt.

8. The capacitor set forth in claim 7 wherein said electrolyte material consists of polyethylene oxide, activated carbon, and a salt selected from the group consisting of $LiClO_4$, $NaClO_4$, $LiBF_4$, and $LiCF_3SO_3$.

9. The capacitor set forth in claim 8 wherein said electrolyte material additionally contains vanadium oxide.

10. The capacitor set forth in claim 8 wherein said separator layer consists of polyethylene oxide and an inorganic salt selected from the group consisting of $LiClO_4$, $NaClO_4$, $LiBF_4$, and $LiCF_3SO_3$.

* * * * *